(12) United States Patent
Dellock et al.

(10) Patent No.: US 8,642,683 B1
(45) Date of Patent: Feb. 4, 2014

(54) POLYPROPYLENE WITH BIO-BASED AND SYNTHETIC FILLERS FOR LIGHT WEIGHT MATERIAL APPLICATIONS

(71) Applicant: Ford Global Technologies, LLC, Dearborn, MI (US)

(72) Inventors: Paul Kenneth Dellock, Northville, MI (US); Joel Thomas Pierce, Whitmore Lake, MI (US); Talat Karmo, Waterloo, MI (US)

(73) Assignee: Ford Flobal Technologies, LLC, Dearborn, MI (US)

( * ) Notice: Subject to any disclaimer, the term of this patent is extended or adjusted under 35 U.S.C. 154(b) by 0 days.

(21) Appl. No.: 13/868,231

(22) Filed: Apr. 23, 2013

(51) Int. Cl.
*C08K 5/00* (2006.01)
*C08K 7/02* (2006.01)
*C08K 13/02* (2006.01)
*C08K 13/00* (2006.01)

(52) U.S. Cl.
USPC .................................. 524/15; 524/13; 524/14

(58) Field of Classification Search
USPC .............................................. 524/13, 14, 15
See application file for complete search history.

(56) References Cited

U.S. PATENT DOCUMENTS 4,746,688 A * 5/1988 Bistak et al. .................. 523/220
2012/0108728 A1 5/2012 Tranninger

FOREIGN PATENT DOCUMENTS

EP 2281851 A1 2/2011

OTHER PUBLICATIONS

Agunsoye J. Olumuyiwa, et al. Journal of Minerals and Materials Characterization and Engineering, Study of Mechanical Behavior of Coconut Shell Reinforced Polymer Matrix Composite, 2012, 11, 774-779.

* cited by examiner

*Primary Examiner* — Ling Choi
*Assistant Examiner* — David L Miller
(74) *Attorney, Agent, or Firm* — Raymond L. Coppiellie; Brooks Kushman P.C.

(57) ABSTRACT

A polypropylene composition for injection molded parts. The composition includes bio-based fillers (such as coconut shell powder), synthetic fillers and mineral fillers (such as talc powder and Wollastonite). The polypropylene polymer may be virgin polypropylene, recycled polypropylene or a combination of virgin and recycled polypropylene. A polyolefin elastomer such as an ethylene-octene copolymer is included to improve impact resistance. A reinforcing agent, nucleator and melt flow enhancer may also be included in the composition to improve product performance and processing.

10 Claims, No Drawings

POLYPROPYLENE WITH BIO-BASED AND SYNTHETIC FILLERS FOR LIGHT WEIGHT MATERIAL APPLICATIONS

TECHNICAL FIELD

This disclosure relates to polypropylene that includes bio-based fillers, synthetic fillers and other additives.

BACKGROUND

Talc filled polypropylene and talc filled thermoplastic polyolefin materials are currently the principal materials that are used for exterior molded automotive trim. Reducing weight of future vehicles while increasing the amount of sustainable materials made from recycled and/or renewable materials is a problem that automobile manufacturers face. The primary ways to reduce the weight of plastic parts are to reduce the thickness of the part and to reduce the density of the material used to make the part.

The density of recycled thermoplastic materials is largely determined by the selection of the type and quantity of fillers. Talc is the primary filler used by most recyclers. Talc and other fillers are used to reinforce plastics to increase stiffness and strength. One example of a thermoplastic polyolefin formulation that uses recycled polypropylene is provided below:

| | |
|---|---|
| recycled polypropylene | 55-65% |
| polyolefin elastomer | 10-20% |
| talc powder | 10-30% |
| other additives | 0-5% by weight. |

Recycled polypropylene and thermoplastic polyolefin materials have higher melt flow rates when compared to virgin product. However, recycled polypropylene and thermoplastic polyolefin materials may still not have sufficiently high melt flow rates (35 to 50 g/10 min or higher, per ASTM D1238 or ISO 1133, at 230 C. and 2.16 kg load) and are difficult to process in injection molding machines that have thin walls (2.5 mm and thinner).

Recycled materials have melt flow rates that are determined by the composition of the materials that are being recycled. The melt flow rate of recycled thermoplastic materials is an average of the melt flow rate of the ingredients. The melt flow rate of the recycled material may limit minimum part thickness in injection molding processes. Increasing melt flow rates of injection molded materials is a key to molding thin walled parts. Part performance and appearance must be maintained as the wall thickness of parts is reduced. Material stiffness must be significantly increased to 2,000 MPa flexural modulus or greater to maintain performance in parts having thinner walls.

Talc and other fillers are primarily used to reinforce plastics and increase stiffness and strength. Talc also stabilizes plastics by reducing the Coefficient of Linear Thermal Expansion (hereinafter "CLTE"). Talc acts as a nucleating agent enhancing material solidification in the injection molding process. Talc increases the speed of nucleation (solidification) of the material as it is cooled in a mold. Conventional fillers like talc tend to adversely increase part density, reduce material ductility and degrade surface quality. Talc has a density of about 2.6 g/cm$^3$ (ASTM D792-08) and is the primary filler used in automotive plastics. Automotive plastics typically use between 10% and 30% by wt. talc as filler.

Other reinforcements such as glass fiber, carbon fiber, and nano-composites may be relatively heavy or abrasive. Carbon fiber, nano-composites and other reinforcements are used to stiffen polypropylene and thermoplastic polyolefin materials to a greater extent than is feasible with talc. Abrasive fillers cause tool wear over time that may degrade part appearance. The abrasiveness of the material wears out steel tools making the filler unsuitable for high volume automotive trim parts that have a class "A" surface. In addition, carbon fiber and nano-composites are in limited supply, expensive and difficult to mold.

The fillers in filled polypropylene and talc filled thermoplastic polyolefin materials typically range from 10 to 40% by weight. The density of unfilled polypropylene density is approximately 0.9 g/cm$^3$. For example, 20% talc filled polypropylene, polyethylene, or polyolefin materials have a density of about 1.04. In another example, 40% talc filled polypropylene, polyethylene, or polyolefin materials have a density of 1.22. The relatively high density of talc offsets any weight savings that may be expected as a result of reducing part wall thickness.

The above problems and challenges are addressed by this disclosure as summarized below.

SUMMARY

Recycled materials that have lower density and that are molded thinner can be utilized to reduce the weight of future vehicles while providing favorable performance characteristics and appearance. Favorable characteristics include stiffness (flexural modulus), impact resistance, lower density, low coefficient of linear thermal expansion, and sound dampening quality.

Reinforcing materials comprising of a blend of bio-based fillers and synthetic fillers are proposed for density reduction. The range of quantity of reinforcing materials by weight percent is expected to be 1% to 17%. All % values as used in this application are weight % and are based on the total weight of the composition. Thermoplastic materials with a blend of bio-based fillers and synthetic fillers may lower the CLTE to prevent warping. Other additives are proposed to increase the nucleation of the material.

Bio-based fillers such as wood fiber, ground coconut shells and agave fiber have densities less than 1.2 that are less than half the density of talc. One bio-based filler material that is similar to talc as a reinforcing agent is ground coconut shells having a particle size of 150 microns and may obtained from Natural Composites, Inc. under the trade name of CSP. Ground coconut shells are stiff and have excellent compression strength. The compression characteristics of ground coconut shells are similar to talc at similar load levels. The CLTE of ground coconut shells is also similar to talc.

However, bio-based fillers have poor heat conduction properties. Ground coconut shells are less dense than talc and do not provide the same nucleation improvements as talc.

A material with significantly higher flexural modulus is required to maintain performance and feel when compounding with bio-based fillers.

Synthetically derived mineral fillers like Milliken Chemical's Hyperform® HPR-803i have similar stiffness and strength reinforcement properties as compared to chopped glass. The synthetic mineral fillers are made from a softer material that is not abrasive to aluminum or steel tools. Stiff synthetic mineral fillers that are more expensive than talc and low density bio-based fillers may be blended to reduce the overall cost and obtain the desired processing and physical properties. Another mineral filler is Wollastonite, a calcium inosilicate mineral ($CaSiO_3$).

Biobased-fillers are thermal insulators that do not conduct heat as well as talc or other mineral fillers. The use of insulating fillers can result in longer molding cycle times and increased part warping. Recently, new families of nucleating agents have been developed such as Milliken's Hyperform® 68L that act as a catalyst crystallizing polypropylene at a higher temperature. It takes longer to crystallize or solidify at lower temperatures than at higher temperatures. The added time required to crystallize the polypropylene adds to part manufacturing cycle times because a part cannot be ejected until it is solidified. Such nucleating agents maximize processing speeds and reduce polymer degradation during longer processing time and improve CLTE and Heat Deflection Temperature (hereinafter "HDT").

Flow enhancers are used to reduce friction in extrusion and injection processes. Flow enhancers increase melt flow rates, reduce processing temperatures, and increase productivity. Flow enhancers can be used to reduce injection pressures and enable a molder to more readily fill a thin wall tool. Many flow enhancers are silicone based and parts containing them cannot be painted or chrome plated. However, flow enhancers like Quick Shot (a trademark of Arbor Plastics Technologies) use additives that are compatible with paint or chrome.

According to one aspect of this disclosure, a thermoplastic composition is provided that comprises a thermoplastic resin including a bio-based filler, a synthetic filler fiber, a flow enhancer and a nucleating agent. A flow enhancer may not be required if the resin has a sufficiently high melt flow rate. However, the need to reduce wall thickness of the part makes the inclusion of a flow enhancer essential.

According to another aspect of this disclosure, a polypropylene-based polymer is provided that includes the following active ingredients: polypropylene (SG899 or KW308A) 58-70%; polyolefin elastomer—ethylene-octene copolymer (Engage 8842) 8-20%; talc 0-23%; Reinforcing agent (Milliken HPR-803i) 1-12%; coconut shell powder 1-15%; Wollastonite 0-17%; melt flow enhancer (Arbor Plastic Tech—Quick Shot) 1-4%; and nucleator (Hyperform HPN-68L) 0-5% by weight.

The above features and aspects of this disclosure will be described in greater detail below.

DETAILED DESCRIPTION

However, it is to be understood that the disclosed embodiments are intended to be merely examples that may be embodied in various and alternative forms. The specific structural and functional details disclosed are not to be interpreted as limiting, but as a representative basis for teaching one skilled in the art how to practice the disclosed concepts.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "copolymer," "terpolymer," "pre-polymer," and the like.

A polypropylene composition is disclosed that is suitable for injection molded automotive exterior parts. The composition includes bio-based fillers (such as coconut shell powder) and may also include mineral fillers (such as talc powder) and synthetic fillers. The polypropylene-based polymer may be virgin polypropylene, recycled polypropylene or a combination of virgin and recycled polypropylene. A polyolefin elastomer such as an ethylene-octene copolymer is included to improve impact resistance. A reinforcing agent, nucleator and melt flow enhancer may also be included in the composition to improve product performance and processing.

The acceptable ranges for an exemplary composition is provided below in the following table:

|  | Wgt. % |
| --- | --- |
| Polypropylene (virgin or recycled) | 58-70% |
| Polyolefin Elastomer | 8-20% |
| Talc Powder | 0-23% |
| Coconut Shell Powder and/or Jute | 1-20% |
| Reinforcing Agent | 1-12% |
| Wollastonite | 0-17% |
| Melt Flow Enhancer | 1-4% |
| Nucleator and other additives | 1-5% |

The constituents of the above formula are described more specifically below. The virgin polypropylene may be a polypropylene copolymer. One suitable example is Lyondell Basell Pro-fax SG899 a high-flow, high impact polypropylene copolymer resin. Alternatively or in combination, a recycled thermoplastic polyolefin elastomer may be used such as KW Plastics KW308A.

A polyolefin elastomer may be added for impact resistance. An example of the polyolefin elastomer may be selected such as Dow Chemical Engage 8842 which is an ultra-low density ethylene-octene copolymer.

The fillers in the composition may be talc, bio-based or synthetic fillers. An example of a bio-based filler is coconut shell powder. Talc may also be used as a filler but the quantity of talc is minimized due to the fact that talc is denser that bio-based fillers such as coconut shell powder.

A reinforcing agent is used to increase the stiffness of the resulting molded part. One example of a reinforcing agent is Milliken Hyperform HPR-803i a synthetic, mineral based fiber that also functions as a synthetic filler.

Other potential constituents are primarily included to improve processing and include melt flow enhancers and nucleators. One example of a melt flow enhacncer is Arbor Plastic Tech Quick Shot. One example of a nucleator is Milliken Hyperform HPN-68L. Other additives such as UV/Heat stabilizer and colorants may be added.

The following examples are carried out in an injection molding machine. A one-end gated activity is used to make test specimens as defined in ISO 1873-2.

EXAMPLE 1

A polypropylene polymer is provided as follows:

| | |
|---|---|
| polypropylene | 58-62% |
| polyolefin elastomer | 8-12% |
| talc | 5-7% |
| coconut shell powder | 5-10% |
| synthetic fiber | 8-12% |
| melt flow enhancer | 1-3% |
| nucleator | 2% by weight |

The above polypropylene polymer is proposed to achieve increased stiffness compared to other polypropylene-based polymer compositions. Stiffness is measured in a three-point bend test according to ISO 178 using a 64 mm support span and 2 mm/min. test speed to develop a flexural modulus ranging between 1,900-2,400 MPa.

EXAMPLE 2

A polypropylene polymer is provided as follows:

| | |
|---|---|
| polypropylene | 58-62% |
| polyolefin elastomer | 17-20% |
| talc | 8-15% |
| Wollastonite | 3-7% |
| nucleator | 2% by weight |

The above polypropylene-based polymer is proposed to achieve increased impact resistance compared to other polypropylene polymer compositions. Impact resistance is measured in a Notched Izod test (ISO 180/1A). At 23+/−2° C.=28 kJ/m$^2$ partial break. At −40+/−2° C.=2.6 kJ/m$^2$ complete break. At 0+/−2° C.=8.0 kJ/m$^2$ partial and complete break.

EXAMPLE 3

A polypropylene polymer is provided as follows:

| | |
|---|---|
| polypropylene | 58-62% |
| polyolefin elastomer | 10-12% |
| talc | 10-15% |
| Wollastonite | 10-13% |
| nucleator | 2% by weight. |

The above polypropylene polymer is proposed to achieve a reduced coefficient of linear thermal expansion compared to other polypropylene-based polymer compositions. Linear thermal expansion is measured per ISO 11359-2, 30° C. to 100° C. to achieve 4.4-6.5 mm/mm/° C. in the Flow Direction and 5.0-7.4 mm/mm/° C. in the X-Flow direction.

EXAMPLE 4

A polypropylene polymer is provided as follows:

| | |
|---|---|
| polypropylene | 60-62% |
| polyolefin elastomer | 10-12% |
| talc | 0-10% |
| coconut shell powder | 12-15% |
| synthetic fiber | 1-5% |
| melt flow enhancer | 0-3% |
| nucleator | 2% by weight |

The above polypropylene polymer is proposed to achieve a reduced density of less than 1.04 g/cm$^3$ per ISO 1183, Method A.

EXAMPLE 5

A polypropylene polymer is provided as follows:

| | |
|---|---|
| polypropylene | 58-62% |
| polyolefin elastomer | 13-17% |
| talc | 2-4% |
| coconut shell powder | 8-12% |
| synthetic fiber | 3-5% |
| melt flow enhancer | 2-4% |
| nucleator | 2% by weight |

The above polypropylene-based polymer is proposed to achieve a balanced set of properties that meet the standards expressed with respect to the material properties described with reference to EXAMPLES 1-4 above.

EXAMPLE 6

A polypropylene polymer is provided as follows:

| | |
|---|---|
| polypropylene | 58-62% |
| polyolefin elastomer | 13-17% |
| talc | 2-4% |
| Wollastonite | 11-17% |
| melt flow enhancer | 2-4% |
| nucleator | 2% by weight |

The above polypropylene-based polymer is proposed to achieve a balanced set of properties that meet the standards expressed with respect to the material properties described with reference to EXAMPLES 1-4 above.

While exemplary embodiments are described above, it is not intended that these examples describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. The polypropylene-based composition comprising:

| | |
|---|---|
| polypropylene | 58-62% |
| polyolefin elastomer | 8-12% |
| talc | 5-7% |
| coconut shell powder | 5-10% |
| synthetic fiber | 8-12% |
| Wollastonite | 0-17% |
| melt flow enhancer | 1-3% |
| nucleator | 2% by weight. |

2. The polypropylene-based composition comprising:

| | |
|---|---|
| polypropylene | 58-62% |
| polyolefin elastomer | 17-20% |
| talc | 8-15% |
| coconut shell powder | 1-15% |
| synthetic fiber | 0-12% |
| Wollastonite | 3-7% |
| melt flow enhancer | 0-4% |
| nucleator | 2% by weight. |

3. The polypropylene-based composition comprising:

| | |
|---|---|
| polypropylene | 58-62% |
| polyolefin elastomer | 10-12% |
| talc | 10-15% |
| coconut shell powder | 1-15% |
| synthetic fiber | 0-12% |
| Wollastonite | 10-13% |
| melt flow enhancer | 0-4% |
| nucleator | 2% by weight. |

4. The polypropylene-based composition comprising:

| | |
|---|---|
| polypropylene | 60-62% |
| polyolefin elastomer | 10-12% |
| talc | 0-10% |
| coconut shell powder | 12-15% |
| synthetic fiber | 1-5% |
| Wollastonite | 0-17% |
| melt flow enhancer | 0-3% |
| nucleator | 2% by weight. |

5. The polypropylene-based composition comprising:

| | |
|---|---|
| polypropylene | 60-70% |
| polyolefin elastomer | 8-12% |
| talc | 17-23% |
| coconut shell powder | 1-15% |
| synthetic fiber | 0-12% |
| Wollastonite | 0-17% |
| melt flow enhancer | 0-4% |
| nucleator | 2% by weight. |

6. The polypropylene-based composition comprising:

| | |
|---|---|
| polypropylene | 58-62% |
| polyolefin elastomer | 13-17% |
| talc | 2-4% |
| coconut shell powder | 8-12% |
| synthetic fiber | 3-5% |
| Wollastonite | 0-17% |
| melt flow enhancer | 2-4% |
| nucleator | 2% by weight. |

7. The polypropylene-based composition comprising:

| | |
|---|---|
| polypropylene | 58-62% |
| polyolefin elastomer | 13-17% |
| talc | 2-4% |
| coconut shell powder | 1-15% |
| synthetic fiber | 0-12% |
| Wollastonite | 11-17% |
| melt flow enhancer | 2-4% |
| nucleator | 2% by weight. |

8. A polypropylene-based composition comprising:

| | |
|---|---|
| polypropylene | 58-70% |
| polyolefin elastomer | 8-20% |
| mineral filler | 17-23% |
| synthetic fiber | 1-12% |
| bio-based filler | 1-15% by weight. |

9. The polypropylene-based composition of claim 8 wherein the bio-based filler is selected from the group consisting of:

coconut shell powder;

wood fiber;

agave fiber.

10. The polypropylene-based composition of claim 8 wherein the mineral filler is selected from the group consisting of:

talc; and calcium inosilicate.

\* \* \* \* \*

UNITED STATES PATENT AND TRADEMARK OFFICE
CERTIFICATE OF CORRECTION

PATENT NO. : 8,642,683 B1
APPLICATION NO. : 13/868231
DATED : February 4, 2014
INVENTOR(S) : Paul Kenneth Dellock et al.

It is certified that error appears in the above-identified patent and that said Letters Patent is hereby corrected as shown below:

On the Title Page, delete:

"(73)   Assignee:   Ford Flobal Technologies, LLC"

and insert therefor:

--(73)   Assignee:   Ford Global Technologies, LLC--

Signed and Sealed this
Eighth Day of April, 2014

Michelle K. Lee
*Deputy Director of the United States Patent and Trademark Office*